United States Patent [19]

Mathieu

[11] 4,217,144

[45] Aug. 12, 1980

[54] HIGH ALUMINA REFRACTORY CEMENT AND A PROCESS FOR PRODUCING THE SAME

[75] Inventor: Alain Mathieu, Montelimar, France

[73] Assignee: Lafarge Fondu International, Neuilly sur Seine, France

[21] Appl. No.: 931,135

[22] Filed: Aug. 4, 1978

Related U.S. Application Data

[63] Continuation of Ser. No. 775,840, Mar. 9, 1977, abandoned.

[30] Foreign Application Priority Data

Jan. 5, 1977 [FR] France .................................. 77 00130

[51] Int. Cl.$^2$ ................................................ C04B 7/32
[52] U.S. Cl. ................................................... 106/104
[58] Field of Search ................................... 106/104, 65

[56] References Cited

U.S. PATENT DOCUMENTS

| | | | |
|---|---|---|---|
| 2,681,860 | 6/1954 | Rhodes et al. | 106/65 |
| 2,845,360 | 7/1958 | King et al. | 106/104 |
| 3,150,992 | 9/1964 | Crowley | 106/104 |
| 3,705,815 | 12/1972 | Alegre et al. | 106/104 |
| 3,997,353 | 12/1976 | Chervenka et al. | 106/104 |
| 4,015,993 | 4/1977 | Natsuume | 106/104 |

Primary Examiner—O. R. Vertiz
Assistant Examiner—Mark Bell
Attorney, Agent, or Firm—Burgess, Ryan and Wayne

[57] ABSTRACT

This invention concerns a high-alumina refractory cement, which contains, in addition to ingredients adapted to form a hydraulic bond, and standard secondary ingredients, one or more ingredients adapted to form a phosphatic chemical bond.

The invention concerns a high-alumina refractory cement and the process used to prepare it.

22 Claims, No Drawings

HIGH ALUMINA REFRACTORY CEMENT AND A PROCESS FOR PRODUCING THE SAME

RELATED U.S. APPLICATION

This application is a continuation of U.S. Ser. No. 775,840 filed Mar. 9, 1977 now abandoned.

Priority is claimed under 35 USC 119 of French patent application No. 77 00 130 dated Jan. 5, 1977, a certified copy of which is of record in the file of the parent application Ser. No. 775,840 filed Mar. 9, 1977.

BACKGROUND OF THE INVENTION

This invention concerns a high-alumina refractory cement and a process for producing the same.

One important purpose of the invention is to provide a cement with good refractory properties, but which can be used under conditions similar to those applicable to conventional cements. This new refractory cement also offers the general advantage of allowing simple starting materials to be used.

This invention relates to a high-alumina refractory cement which contains, in addition to ingredients adapted to form a hydraulic bond, one or more ingredients adapted to form a phosphatic chemical bond.

This new high-alumina refractory cement offers an unexpected solution to the problem of deficiencies in performance that can occur at intermediate temperatures with concretes obtained using only aluminous binders. Previously, this problem was solved by mixing the ingredient designed to produce a hydraulic bond with a filler; this produces ceramic bonds at intermediate temperatures, at which hydraulic bonds deteriorate. The ceramic bonds result from sintering of the filler with the other ingredients, at intermediate temperatures. This premature ceramization ensures the strength of the concrete when the hydraulic bond deteriorates at these intermediate temperatures.

The high alumina refractory cement according to the invention offers high performances at intermediate temperatures.

This invention in fact concerns a high-alumina refractory cement which, in addition to ingredients adapted to form a hydraulic bond, and conventional secondary ingredients, contains one or more ingredients adapted to form a phosphatic chemical bond. This phosphatic chemical bond offers an unexpected cheap, simple solution to the problem of the zone of weakness found at intermediate temperatures in concretes made from conventional high-alumina cements.

The secondary ingredients consist of compounds normally used in this field, such as monosodium citrate, and carboxylic acids and their salts.

In one embodiment of the invention, the ingredients designed to promote the phosphatic chemical bond consist of 0.5 to 5% by weight (expressed as phosphorus pentoxide $P_2O_5$), in relation to the weight of high-alumina cement, of at least one soluble alkaline phosphate. The content of soluble alkaline phosphate, expressed as $P_2O_5$, is preferably between 1.5 and 5%. Moreover, in another embodiment of the invention, the soluble alkaline phosphate is sodium hexametaphosphate, tripolyphosphate or pentapolyphosphate. It is preferably sodium hexametaphosphate.

In one embodiment of the invention, the ingredients adapted to form a hydraulic bond consist of a clinker obtained from aluminous materials on the one hand, and calcerious or dolomitic materials on the other.

According to another feature of the invention, the ingredients adapted to form a hydraulic bond essentially comprise a clinker containing at least 35% by weight of monocalcic aluminate (CA) in relation to the weight of clinker.

According to yet another feature of the invention, the aluminous material forms 65 to 95% of the weight of high-alumina refractory cement, and consists at least partly of calcined alumina.

According to one feature of the invention, the high-alumina refractory cement has a minimum specific surface area measured by gas flow (Blaine) of 4300 $cm^2/g$.

This invention also relates to a process for manufacturing this new high-alumina refractory cement, in which cement clinker and calcined alumina are ground together, and the phosphatic ingredient and secondary ingredients are mixed in after grinding.

The invention also relates to a process for manufacturing this new high-alumina refractory cement, in which a ground clinker, a calcined alumina which has previously been ground, the phosphatic ingredient or ingredients, and secondary ingredients, are mixed together.

The clinker is preferably ground to ensure a Blaine specific surface area of approximately 3000 to 5000 $cm^2/g$, and preferably approximately 3600 to 4000 $cm^2/g$.

According to one feature of the invention, the high-alumina refractory cement is obtained by mixing:

20 to 90% by weight of clinker containing at least 35% CA 2 to 79% by weight of calcined alumina with a specific surface-area of between 0.3 and 50 $m^2/g$, measured by gas adsorption, (BET).

0.5 to 5% by weight of soluble alkaline phosphate, expressed in percentage weights of $P_2O_5$.

The clinker used is obtained by the fusing or sintering at between 1400° and 1700° C. of aluminous materials and calcitic and/or dolomitic materials. Limestone, magnesian limestone, dolomitic limestone, each possibly decarbonated, and similar substances can be used for this purpose.

The aluminous material used to make the clinker is selected from bauxites, laterites or other aluminous ores and particularly red bauxites, white bauxites with low iron oxide content, or hydrated or calcined aluminas. The BET specific surface-area of the calcined alumina added to the clinker is preferably between 0.5 and 10 $m^2/g$.

The invention is illustrated by, without being confined to, the following examples, which will reveal other purposes and benefits thereof.

EXAMPLES 1 to 10

530 kg high-alumina cement clinker containing approximately 70% CA (Blaine surface area 3700 $cm^2g$) was placed in a Lodige batch mixer, together with 480 kg of a commercial alumina reground to 6000 $cm^2g$ and containing at least 90% α-alumina; additives, namely sodium hexametaphosphate and monosodium citrate, were also placed in the mixer.

Table I below shows the quantities of sodium hexamethaphosphate (also expressed as $P_2O_5$) and monosodium citrate added.

The effect of the soluble alkaline phosphate content on the hydraulic and refractory properties of fireclay concretes made from this cement is also shown in Table I.

This table shows that performances in flexion (F) and in compression (C) (in bars) after heating and cooling again to room temperature are little affected by possible variations in additives.

TABLE I

| | Phosphate containing complex,% | | | | Fireclay concrete 42-44% (0-5 mm)$^{(a)}$ - content 500 kg/m$^3$$^{(b)}$ | | | | | | | |
|---|---|---|---|---|---|---|---|---|---|---|---|---|
| | | | | | Storage at 20° C. | | | | After heating to | | | |
| | | | | | 6h | | 24h | | 800° C. | | 1100° C. | |
| Example | HMP* | P$_2$O$_5$ | CM** | W/C*** | F | C | F | C | F | C | F | C |
| 1 | 3 | | 0.3 | 0.34 | 19 | 125 | 49 | 500 | 105 | 1005 | 85 | 600 |
| 2 | 3 | 1.86 | | | 19 | 130 | 55 | 530 | 100 | 955 | 84 | 630 |
| 3 | | 2.17 | 0.5 | 0.34 | 27 | 170 | 45 | 550 | 95 | 975 | 88 | 610 |
| 4 | 3.5 | | 0.3 | 0.34 | 21 | 155 | 43 | 495 | 98 | 990 | 90 | 595 |
| 5 | 3.5 | 2.17 | | | 20 | 110 | 42 | 480 | 110 | 990 | 84 | 585 |
| 6 | | 2.17 | 0.5 | | 35 | 160 | 46 | 505 | 87 | 965 | 82 | 600 |
| 7 | 4 | | 0.3 | 0.34 | 25 | 160 | 52 | 570 | 110 | 965 | 90 | 600 |
| 8 | 4 | 2.48 | | | 24 | 210 | 55 | 585 | 94 | 1010 | 86 | 585 |
| 9 | | 2.48 | 0.5 | 0.34 | 36 | 190 | 50 | 495 | 84 | 935 | 80 | 615 |
| 10 | 8 | 5.00 | 0.5 | 0.34 | 8 | 30 | 38 | 285 | 128 | 1315 | 99 | 615 |

*HMP = Sodium hexametaphosphate
**CM = Monosodium citrate
***W/C = water/cement weight ratio
$^{(a)}$with 42 to 44% Al$_2$O$_3$ and a grain-size of 0-5 mm (Fuller curve)
$^{(b)}$500 kg cement per m$^3$ of concrete Chemical analysis of the high-alumina fire resistant cement from examples 8 and 9 revealed the following composition:

| | |
|---|---|
| SiO$_2$ | 0.15 |
| Al$_2$O$_3$ | 79.80 |
| CaO | 14.90 |
| Al$_2$O$_3$ (free) | 47.45 |
| Fe$_2$O$_3$ | 0.05 |
| K$_2$O | 0.01 |
| Na$_2$O | 1.50 |
| SO$_3$ | 0.10 |
| P$_2$O$_5$ | 2.48 |
| Fire losses | 0.7 |

Grain-sizes, measured with a laser technique, were as follows:

| Diameter (microns) | percentage |
|---|---|
| <2 | 14 |
| <4 | 35 |
| <8 | 60 |
| <16 | 74 |
| <32 | 85 |
| <64 | 97 |

Finally, the following physical properties were measured:

| | |
|---|---|
| Density | 3.29 |
| Blaine specific surface-area (cm$^2$/g) | 4370 |
| BET surface-area (m$^2$/g) | 1 |
| Amount of water required for pure paste | 24% |

This high-alumina refractory cement does not necessarily need to be prepared in a Lodige batch mixer; mixing can be done in other types of mixers, operating continously or intermittently.

EXAMPLE 11

520 kg of aluminous clinker and 480 kg of alumina were placed in a mill, and ground together until a Blaine specific surface-area of 4900 g/cm$^2$ was obtained. 40 kg of sodium hexametaphosphate and 3 kg of monosodium citrate were then added and mixed in a mixer, using the same procedure as in Examples 1 to 10.

Fireclay concretes made from the cement from Examples 7 and 8 had approximately the same properties as those obtained during tests for these examples, shown in Table I. The advantage of grinding materials together is to avoid the need for a special alumina grinder in the installation. This saves equipment costs.

EXAMPLES 12 and 13

High-alumina refractory cements were prepared from 930 kg of clinker containing 70% of CA, 70 kg of alumina and 40 kg of HMP (Example 12) or 50 kg of HMP (Example 13), following the procedure described for Examples 1 to 10. The resulting cements contained 63% CA and 2.48% (Example 12) and 3.1% (Example 13) by weight of P$_2$O$_5$, that is to say 4% and 5% respectively of HMP. Fireclay concretes made from these cements had the properties shown in Table II below.

TABLE II

Fireclay (42–44% Al₂O₃) concrete - 500 kg/m³ cement content

| Example | % P$_2$O$_5$ | W/C | Storage at 20° C. 6h | | 24h | | After heating 110° C. | | 800° C. | | 1100° C. | |
|---|---|---|---|---|---|---|---|---|---|---|---|---|
| | | | F | C | F | C | F | C | F | C | F | C |
| 12 | 2.48 | 0.38 | 47 | 435 | 87 | 740 | 116 | 1035 | 108 | 1155 | 95 | 715 |
| 13 | 3.10 | 0.38 | 42 | 390 | 79 | 625 | 117 | 1030 | 79 | 965 | 79 | 705 |

TABLE III

Fireclay concrete*

| Example | W/C | Storage at 20° C. 6h | | 24h | | After heating 800° C. | | 1100° C. | | 1400° C. | |
|---|---|---|---|---|---|---|---|---|---|---|---|
| | | F | C | F | C | F | C | F | C | F | C |
| 14 | 0.36 | 18 | 95 | 29 | 105 | 61 | 630 | 45 | 310 | 156 | 1070 |

*As defined in Table I.

TABLE IV

Fireclay (42–44% Al₂O₃ concrete - 500 kg/m³ cement content
Effect of polymer phosphates

| Phosphates added Type % | W/C | Storage at 20° C. 6h | | 24h | | After heating 800° C. | | 1100° C. | |
|---|---|---|---|---|---|---|---|---|---|
| | | F | C | F | C | F | C | F | C |
| 15 Sodium tripolyphosphate 2% | 0.39 | 30 | 210 | 62 | 395 | 59 | 640 | 52 | 440 |
| 16 Sodium tripolyphosphate 4% | 0.39 | 0 | 25 | 50 | 300 | 104 | 950 | 54 | 480 |
| 17 Sodium pentapolyphosphate 2% | 0.39 | 65 | 590 | 87 | 675 | 110 | 1060 | 73 | 560 |
| 18 Sodium pentapolyphosphate 4% | 0.39 | 72 | 625 | 92 | 780 | 120 | 1100 | 84 | 590 |

EXAMPLE 14

A high-alumina refractory cement was made, using the methods described in Examples 1 to 10, from 550 kg of clinker containing approximately 17% of dolomitic materials (expressed in the form of spinel: Al$_2$O$_3$, MgO) and 35% of CA, 450 kg of alumina reground to 6000 cm²g, 40 kg of HMP and 3 kg of MC.

Fireclay concretes made from these cements had the properties shown in Table III above.

EXAMPLES 15 to 18

High-alumina refractory cement was made using the methods described in Example 12, except that different propertions of sodium tripolyphosphate (Examples 15 and 16) and sodium polyphosphate (Examples 17 and 18) were used.

Table IV above shows the properties of fireclay concretes made from these cements.

EXAMPLES 19 and 20

A high-alumina refractory cement was prepared by the methods described in Examples 7 and 8, except that a reground calcined alumina with a Blaine specific surface-area of 22 000 cm²/g (BET = 10 m²/g) was used.

Fireclay concretes (42–44% Al$_2$O$_3$) and tabular alumina concretes (0–7 mm); containing 500 kg of cement per cubic meter of concrete poured, had the properties shown in Table V below.

TABLE V

| | | Concrete Containing 500 kg/m³ cement | | | | | |
|---|---|---|---|---|---|---|---|
| | | 20° C. 4 h | | After heating 1100° C. | | 1400° C. | |
| Aggregate | W/C | F | C | F | C | F | C |
| Fireclay | 0.34 | 25 | 160 | 123 | 870 | 225 | 1320 |
| Tabular alumina | 0.36 | 32 | 180 | 162 | 1060 | 236 | 1190 |

This cement in fact also contains alumina, which acts as a filler and also produces a ceramic bond.

Cement prepared in this way involves three bonding principles: chemical, hydraulic and ceramic; this is what distinguishes it from other cements. It can be used as a basis for refractory concretes which have to withstand particularly severe conditions.

EXAMPLE 21

High-alumina refractory cement was made by the methods described in Examples 7 and 8, using 210 kg of aluminous clinker containing approximately 70% of CA and 790 kg of alumina reground to 6,000 cm²/g.

Table VI below shows the properties of fireclay concretes made from this cement.

Because of the low CA content of the cement (~16%), concrete made from it shows better resistance to corrosion from certain molten metals.

TABLE VI

| | | Fireclay (42–44% Al$_2$O$_3$) concrete | | | | | |
|---|---|---|---|---|---|---|---|
| | | 20° C. 24 h | | After heating 110° C. | | 1100° C. | |
| Example | W/C | F | C | F | C | F | C |
| 21 | 0.34 | 20 | 165 | 55 | 470 | 40 | 290 |

EXAMPLE 22

High-alumina refractory cement was made by the method described in Examples 7 and 8, using 520 kg of aluminous clinker containing approximately 70% of CA, and 480 of under-calcined alumina (BET = 47 m²/g) reground to approximately 22 000 cm²/g, 40 kg of HMP and 3 kg of MC.

Table VII below shows the properties of fireclay concretes made from these cements.

TABLE VII

| | | Fireclay (42–44% Al$_2$O$_3$) concrete | | | | | |
|---|---|---|---|---|---|---|---|
| | | Storage at 20° C. 6 h | | 24 h | | After heating 800° C. | | 1100° C. | |
| Example | W/C | F | C | F | C | F | C | F | C |
| 22 | 0.38 | 12 | 85 | 20 | 180 | 63 | 658 | 64 | 450 |

Naturally, this invention is in no way confined to the Examples and embodiments described above: many variants are possible for someone skilled in the art, depending on applications, and without any departure from the spirit of the invention.

What is claimed is:

1. A high-alumina refractory cement, consisting essentially of alumina ingredients for forming a hydraulic bond and one or more ingredients for forming a phosphatic chemical bond, said ingredients for forming the hydraulic bond comprising aluminous clinker having a Blaine specific surface area of 3000 to 5000 cm$^2$/g and said ingredients for forming a phosphatic chemical bond consisting of 0.5 to 5% by weight in relation to the weight of high-alumina cement of at least one water soluble alkaline phosphate expressed as $P_2O_5$.

2. A cement as defined in claim 1, in which the content of water soluble alkaline phosphate, expressed as $P_2O_5$, is between 1.5 and 5%.

3. A cement as defined in claim 1, in which the water soluble alkaline phosphate is a sodium polyphosphate.

4. A cement is defined in claim 3, in which water soluble alkaline phosphate is sodium hexametaphosphate.

5. A cement as defined in claim 1, in which the ingredients for forming a hydraulic bond consist of a clinker made from aluminous materials and at least one of calcitic materials and dolomitic materials.

6. A cement as defined in claim 5, in which the ingredients for forming a hydraulic bond consist of a clinker containing at least 35% by weight of monocalcium aluminate, in relation to the weight of clinker.

7. A cement as defined in claim 5, in which the aluminous material forms 65 to 95% of the weight of the high-alumina cement, and consists at least partly of calcined alumina.

8. A cement as defined in claim 1, which has a minimum Blaine specific surface-area of 4300 g/cm$^2$.

9. A cement as defined in claim 1, further comprising carboxylic acids, salts thereof, or monosodium citrate.

10. A cement as defined in claim 9, containing, monosodium citrate.

11. A process for making a high-alumina refractory cement, consisting essentially of ingredients for forming a hydraulic bond and one or more ingredients for forming a phosphatic chemical bond consisting of 0.5 to 5% by weight in relation to the weight of high-alumina cement of at least one water soluble alkaline phosphate expressed as $P_2O_5$, said process comprising grinding together cement clinker and calcined alumina to a Blaine specific surface area of 3,000 to 5,000 cm$^2$/g, and mixing in the phosphatic ingredient after grinding.

12. A process for making high-alumina fire resistant cement consisting essentially of ingredients for forming a hydraulic bond and one or more ingredients for forming a phosphatic chemical bond consisting of 0.5 to 5% by weight in relation to the weight of high-alumina cement of at least one water soluble alkaline phosphate expressed as $P_2O_5$, said process comprising mixing together a clinker ground to a Blaine specific surface area of 3000 to 5000 cm$^2$/g, previously ground alumina, and the phosphatic ingredient.

13. A process as defined in claim 11, in which 20 to 90% of clinker containing at least 35% of monocalcium aluminate, 2 to 79% of calcined alumina with a BET specific surface-area of between 0.3 and 50 m$^2$/g, and 0.5 to 5% of soluble alkaline phosphate expressed as percentage weights of $P_2O_5$, are mixed together.

14. A process as defined in claim 12, in which 20 to 90% of clinker containing at least 35% of monocalcium aluminate, 2 to 79% of calcined alumina with a BET specific area of between 0.3 and 50 m$^2$/g, and 0.5 to 5% of soluble alkaline phosphate expressed as percentage weights of $P_2O_5$, are mixed together.

15. A process as defined in claim 11, in which the clinker is obtained by fusing or sintering aluminous materials and at least one of calcitic and dolomitic materials at between 1400° and 1700° C.

16. A process as defined in claim 12, in which the clinker is obtained by fusing or sintering aluminous materials and at least one of calcitic and dolomitic materials at between 1400° and 1700° C.

17. A process as defined in claim 11, in which the aluminous material is selected from the group consisting of red bauxites, white bauxites with low iron oxide content, hydrated and calcined aluminas.

18. A process as defined in claim 17, in which the BET specific surface-area of the added calcined alumina is between 0.5 and 10 m$^2$/g.

19. A process as defined in claim 12, in which the aluminous material is selected from the group consisting of red bauxites, white bauxites with low iron oxide content, hydrated and calcined aluminas.

20. A process as defined in claim 19, in which the BET specific surface-area of the added calcined alumina is between 0.5 and 10 m$^2$/g.

21. A process as defined in claim 12, comprising grinding the clinker to a Blaine specific surface-area of about 3600 to 4000 cm$^2$/g.

22. A process as defined in claim 11, wherein said cement further comprises carboxylic acids, salts thereof or monosodium citrate.

* * * * *

UNITED STATES PATENT OFFICE
CERTIFICATE OF CORRECTION

Patent No. 4,217,144      Dated August 12, 1980

Inventor(s) Alain Mathieu

It is certified that error appears in the above-identified patent and that said Letters Patent are hereby corrected as shown below:

Column 4, line 61: After "containing" insert --about--.

Column 7, line 20: "is" should be --as--.

Signed and Sealed this

Thirtieth Day of December 1980

[SEAL]

Attest:

SIDNEY A. DIAMOND

Attesting Officer     Commissioner of Patents and Trademarks